(12) United States Patent
Barton et al.

(10) Patent No.: US 12,430,445 B2
(45) Date of Patent: Sep. 30, 2025

(54) DYNAMIC SECURITY SERVICE EXTENSION BASED ON SOFTWARE BILL OF MATERIALS

(71) Applicant: Cisco Technology, Inc., San Jose, CA (US)

(72) Inventors: Robert Edgar Barton, Richmond (CA); Thomas Szigeti, Vancouver (CA); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 18/307,409

(22) Filed: Apr. 26, 2023

(65) Prior Publication Data
US 2024/0362336 A1 Oct. 31, 2024

(51) Int. Cl.
*H04L 29/06* (2006.01)
*G06F 21/57* (2013.01)
*H04L 29/08* (2006.01)

(52) U.S. Cl.
CPC .................. *G06F 21/577* (2013.01)

(58) Field of Classification Search
CPC .................................... G06F 21/577
USPC .......................................... 726/1
See application file for complete search history.

(56) References Cited

U.S. PATENT DOCUMENTS

| | | | |
|---|---|---|---|
| 11,507,672 B1 * | 11/2022 | Pagnozzi | H04L 63/0263 |
| 11,528,147 B2 * | 12/2022 | Madisetti | H04L 63/20 |
| 11,861,015 B1 * | 1/2024 | Reguly | G06F 17/11 |
| 2014/0123207 A1 | 5/2014 | Agarwal et al. | |
| 2015/0236917 A1 | 8/2015 | Anderson et al. | |
| 2016/0080399 A1 * | 3/2016 | Harris | H04L 63/1433 726/23 |
| 2017/0251013 A1 * | 8/2017 | Kirti | H04L 63/1441 |
| 2018/0077195 A1 | 3/2018 | Gathala et al. | |
| 2020/0128046 A1 | 4/2020 | Schaefer et al. | |
| 2020/0201620 A1 * | 6/2020 | Beard | G06F 8/61 |
| 2020/0296136 A1 | 9/2020 | Liu et al. | |
| 2021/0029151 A1 * | 1/2021 | Brooks | H04L 9/3218 |

(Continued)

FOREIGN PATENT DOCUMENTS

| | | |
|---|---|---|
| CN | 112153049 A | 12/2020 |
| WO | WO2020227266 A1 | 11/2020 |

OTHER PUBLICATIONS

Office Action for U.S. Appl. No. 18/318,182, dated Jan. 24, 2025, 18 pages.

(Continued)

*Primary Examiner* — Haresh N Patel
(74) *Attorney, Agent, or Firm* — Lee & Hayes, P.C.

(57) ABSTRACT

Techniques are described herein for dynamic service extension to provide risk mitigation upon detecting a threat. In embodiments, such techniques may be performed by a service provider platform and may comprise receiving information about a security threat, identifying one or more components susceptible to the security threat, determining, based on a software bill of materials, at least one data flow that includes a point of delivery (pod) associated with the one or more components, identifying at least one additional service determined to mitigate the security threat, and implementing the at least one additional service in relation to the at least one data flow.

20 Claims, 12 Drawing Sheets

(56) References Cited

U.S. PATENT DOCUMENTS

| | | |
|---|---|---|
| 2022/0083652 A1 | 3/2022 | Ransford et al. |
| 2022/0164729 A1* | 5/2022 | Fields .................... G06F 21/31 |
| 2023/0058477 A1 | 2/2023 | Jiang et al. |
| 2023/0177435 A1* | 6/2023 | Sailer ................ G06Q 10/0637 |
| | | 705/7.28 |

OTHER PUBLICATIONS

Ibryam, et al., "Kubernetes Patterns Reusable Elements for Designing Cloud-Native Applications", retreived on Jun. 30, 2021 at URL:https://www.redhat.com/cms/managed-files/cm-oreilly-kubernetes-patterns-ebook-f19824-201910-en.pdf, Red Hat, Apr. 4, 2019, Sections 1 and 15.

PCT Search Report and Written Opinion mailed Feb. 2, 2024 for PCT Application No. PCT/US24/26543, 38 pages.

\* cited by examiner

DYNAMIC SECURITY SERVICE EXTENSION BASED ON SOFTWARE BILL OF MATERIALS

TECHNICAL FIELD

The present disclosure relates generally to vulnerability mitigation, and more particularly to insertion of security services into a data flow within a cloud native architecture upon detection of a potential security vulnerability.

BACKGROUND

Modern software applications are built using a collection of pre-existing libraries, open-source code, and other reusable components, along with custom software code. However, these reusable components, which are often easily accessible by the public, can become susceptible to security threats. For example, malicious actors may review the code for the publicly available components and identify weaknesses of those components that can be exploited in malicious code.

In recent years, businesses have been increasingly adopting cloud-native architectures, as such architectures enable rapid application development with flexibility, stability, portability, and scale. However, such architectures also massively increase the attack surface and can expose applications to new vulnerabilities and threats. At the same time, changes in the computing landscape have increased the risk of catastrophic security breaches.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
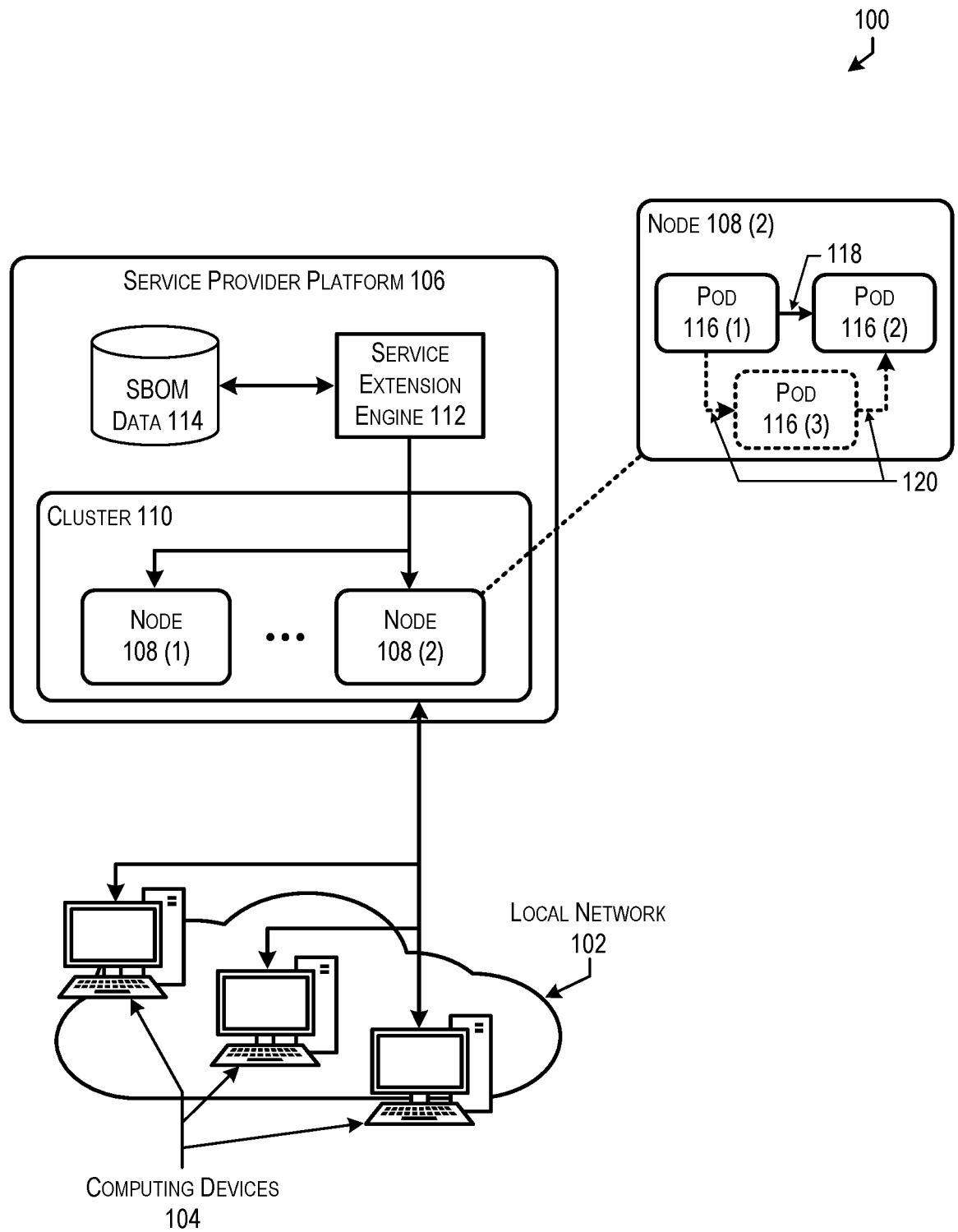
FIG. 1 depicts an example environment in which service extensions may be dynamically implemented upon detecting a potential vulnerability to the data flow in accordance with at least some embodiments.

A first method according to the techniques described herein may include receiving information about a security threat and identifying (e.g., based on a software bill of materials) one or more components susceptible to the security threat, and determining at least one data flow that includes a point of delivery (pod) associated with the one or more components. The techniques may further include identifying at least one additional service determined to mitigate the security threat. Upon identifying such an additional service, the techniques may further include implementing the at least one additional service in relation to the at least one data flow.

A second method according to the techniques described herein may first include identifying a number of software applications capable of being accessed by computing devices in an organization. The method may then include determining, based on a software bill of materials, a number of components associated with the number of software applications, identifying a number of current security threats associated with the number of components, and determining, based on the number of current security threats, a risk score associated with each of the number of software applications. Upon determining a risk score associated with each of the number of software applications, the method may involve receiving, in relation to the organization, an indication of a level of risk for each of the computing devices in the organization, generating, based on the risk score associated with the number of software applications and the level of risk for each of the computing devices, policy data for each of the computing devices, and providing the policy data to at least one second computing device.

Additionally, the techniques described herein may be performed by a system and/or device having non-transitory computer-readable media storing computer-executable instructions that, when executed by one or more processors, performs the method described above.

Example Embodiments

In order to combat the threat posed by software vulnerabilities, the recently signed US Executive Order on Cybersecurity drives a public Software Bill of Materials (SBOM) to secure the software supply chain. An SBOM, or SBOM data, may include any suitable indication of a set of components associated with a software application. SBOM provides a standards-based framework to expose the underlying software ingredients that have been used in a software application, or a microservice that is used as part of a software application.

This disclosure describes techniques that may be performed by a service provider platform to provide risk mitigation within a cloud computing environment. In a cloud computing management, clusters of computing devices (either physical computing devices or virtual computing devices) are used to implement a number of services that may be accessed remotely by users. Each of the clusters of computing devices may include a number of nodes that contain points of delivery configured to perform the respective services.

A point of delivery ("pod") is a module of network, compute, storage, and application components that work together to deliver networking services. The distinction between a pod and other design patterns is that it is a deployable module which delivers a service. Each pod may include a number of containers that are configured to work with each other to provide the service.

In some embodiments, upon detecting a security threat, at least one additional service may be identified as being capable of mitigating the security threat. The identified service may then be implemented via multiple methods. In a first method, a new pod that is configured to perform the additional service is instantiated and inserted into a data flow of the node (e.g., such that the data flow between the existing pods is redirected to the new pod). In a second method, a new pod is generated that is similar to an existing pod but further contains an additional container (e.g., a sidecar container) configured to perform the service. In this second method, the existing pod may be shut down once the new pod has been implemented, in that data originally directed toward the existing pod is then redirected toward the new pod.

Embodiments of the disclosure provide for a number of advantages over conventional systems. For example, by implementing embodiments of the disclosure, newly-detected threats can be quickly mitigated while minimizing the impact of such security threats on end users. Additionally, the use of a software bill of materials to identify components vulnerable to a threat can result in more accurate identification of downstream services that might be vulnerable to the threat.

FIG. 1 depicts an example environment in which service extensions may be dynamically implemented upon detecting a potential vulnerability to the data flow in accordance with at least some embodiments. In FIG. 1, a local area network (LAN) 102 may be accessed by a number of computing devices 104 at a geographic site. As depicted, the computing devices 104 may be in communication with an application platform 106.

The computing devices 104 may be any suitable electronic devices used to access software applications (e.g., software applications hosted by the service provider platform 106). By way of non-limiting example, such computing devices 104 may include a conventional server computer, workstation, desktop computer, laptop, tablet, network appliance, e-reader, smartphone, or other computing device.

The local area network (LAN) 102 may include any suitable collection of communicatively connected electronic devices. In embodiments, the LAN 102 is managed via a router (e.g., a wireless router) or other suitable networking device. Regardless of the specific connectivity configuration for a network implemented in the example environment, a variety of access technologies may be used (e.g., ADSL, 4G, 5G, etc.) in all cases, as well as various networking technologies (e.g., public Internet, MPLS (with or without strict SLA), etc.) to connect the LAN 102 to service provider platform 106. Other deployments scenarios are also possible, such as using Colo, accessing service provider platform 106 via Zscaler™ or Umbrella™ services, and the like.

A service provider platform 106 may be any computing device or collection of computing devices configured to manage access to a number of on-demand services or applications. In some embodiments, the service provider platform 106 may be a Software as a Service (Saas) platform that provides remote access to software services on-demand. In embodiments in which the service provider platform 106 uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java™, C, C # or C++, or any scripting language, such as Perl, Python or TCL, as well as combinations thereof. The server(s) may also include database servers, including without limitation those commercially available from Oracle™, Microsoft™, Sybase™, and IBM™.

In embodiments, a number of nodes 108 (e.g., node 108 (1) and 109 (2)) that may be grouped and managed into a cluster 110 that is hosted on the service provider platform 106. Additionally, the service provider platform 106 may include a service extension engine 112 configured to perform dynamic insertion of services into a data flow. Such a service extension engine 112 may have access to software bill of material (SBOM) data 114 that includes information about which software applications (or services) are associated with various components. For example, the SBOM data 114 may include an indication of which components make up a particular software application or service. In embodiments, each node 108 may include a number of pods 116. Each pod may include a number of software components (implemented via containers) that are configured to work together to perform a particular function associated with that pod 116. In various embodiments, the pods may be configured to route data between each other (via a data flow) in order to provide a service. For example, data may be provided to a node 108 (2) in order to request a service be performed on that data. In node 108 (2), after Pod 116 (1) performs a Function A on received data, it may be configured to route the resulting data to Pod 116 (2), which is then configured to perform a Function B on that data. In this example, the sequence of functions performed on the data may result in the performance of the requested service.

As described in greater detail elsewhere, the service extension engine 112 may be configured to provide dynamic extension/insertion of services into data flows. In embodiments, the service extension engine 112 may determine, using SBOM data 114 and information about current threats/vulnerabilities, a degree of exposure for a particular service to a current threat. Upon making a determination that a particular service may be exposed to a current threat, the service extension engine 112 may be configured to identify a service or other extension that may help mitigate exposure to the detected threat. Upon identifying such a service, the service extension engine 112 may be configured to alter the data flow within a node such that data is directed through the identified service. In one example, a data flow within node 108 (2) may typically be routed from pod 116 (1) to pod 116 (2) via route 118. In this example, the service extension engine 112 may make a determination that the service consisting of Function A and Function B may be at risk of exposure to a current threat. In this example, the service extension engine 112 may determine that Function C, as performed by pod 116 (3), can mitigate the exposure to the threat. Accordingly, the service extension engine 112 may be configured to insert pod 116 (3) into the data flow within node 108 (2). Data along route 118 may be rerouted through pod 116 (3) via route 120.

Figure 2:
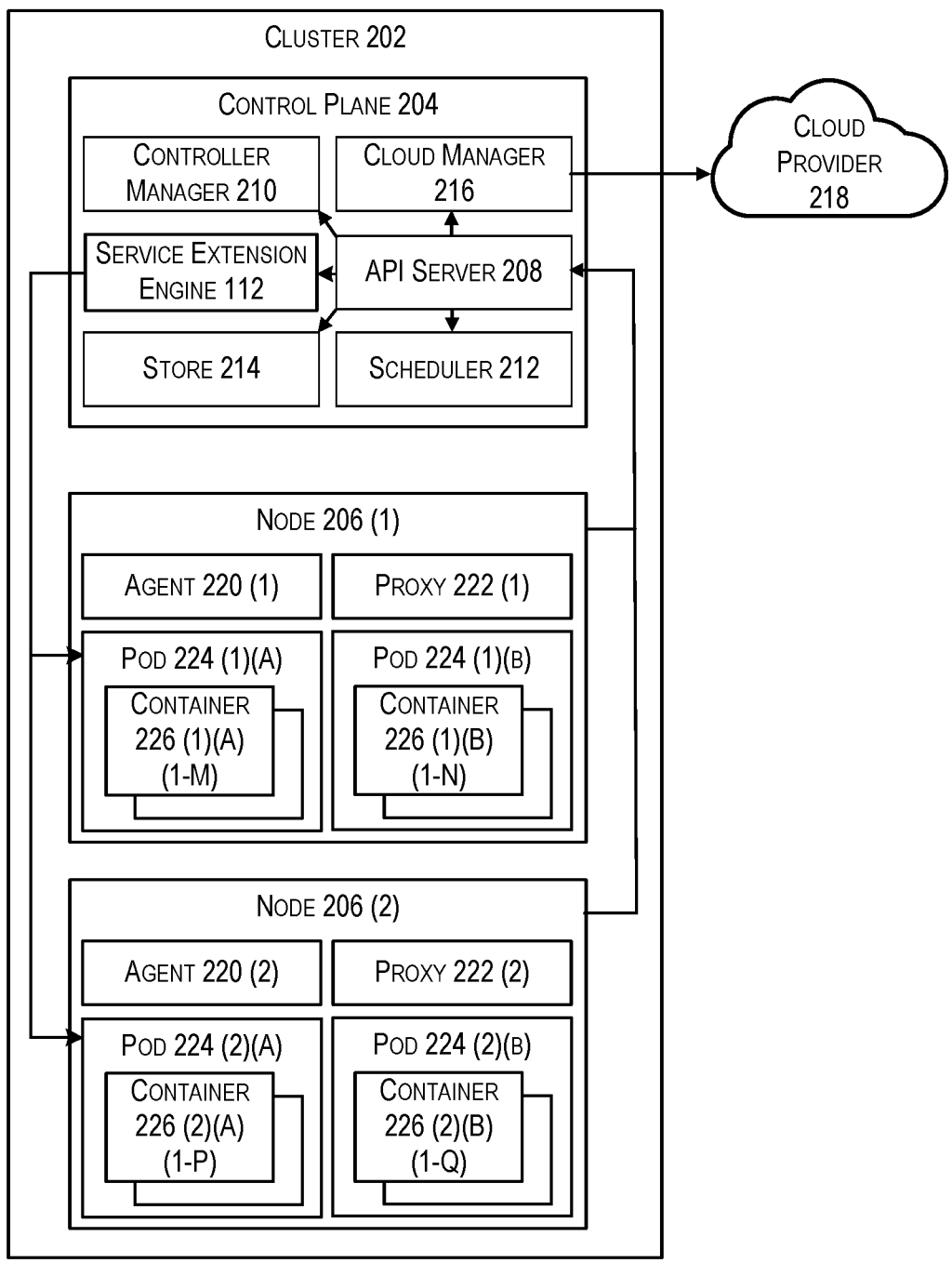
FIG. 2 illustrates an example of a service provider platform 200 that may be implemented for managing containers in a network in accordance with at least some embodiments.

FIG. 2 illustrates an example of a service provider platform 200 that may be implemented for managing containers in a network in accordance with at least some embodiments. In some embodiments, the container orchestrator platform 200 might be the Kubernetes® (K8s) system offered by the Cloud Native Computing Foundation®. In these embodiments, Kubernetes® is an open-source container orchestration system for automating deployment, scaling, and management of application containers across clusters of hosts. However, other embodiments may deploy other service provider platforms, such as Docker Swarm® from Docker®, Inc., Apache Mesos® from the Apache® Software Foundation, or any other suitable service provider platform, without departing from the scope of the present disclosure.

An exemplary service provider platform 200 can include any suitable number of clusters 202. A cluster 202 is a collection of compute, storage, and networking resources that the platform can use to run the various workloads of a network. Each cluster 202 might include one or more hosts consisting of a physical server and/or a virtual machine. As depicted, a cluster might include a control plane 204 and a number of nodes 206 (e.g., node 206 (1) and 206 (2)). In the depicted example, there is one control plane 204 and two nodes 206 in the cluster 202 but other embodiments may include multiple control planes 204 and any suitable number of nodes 206 sufficient to provide a high degree of availability.

The control plane 204 may be responsible for making global decisions about the cluster 202. For example, the control plane 204 may manage scheduling as well as detecting and responding to cluster events (e.g., starting up a new pod when additional computing resources are needed). The control plane 204 can include an Application Programming Interface (API) server 208, a controller manager 210, a scheduler 212, and a persistence store 214 (e.g., a distributed Key Value (KV) store). In some cases, the control plane 204 may optionally include a cloud manager 216 capable of communicating with a cloud provider 218. The control plane 204 components may run on any host in the cluster 202 but might usually run on the same (physical or virtual) machine without nodes 206. In embodiments, the control plane may further include a service extension engine 112, which may be an example of the service extension engine as described in relation to FIG. 1 above. It should be noted that while the service extension engine 112 is depicted in FIG. 2 as being included in the control plane 204 of the cluster 202, the service extension engine 112 may instead be included in the service provider platform 200 outside of such a control plane 204 and even outside of an individual cluster 202.

An API server 208 (e.g., a kube-apiserver) can operate as the front-end of the control plane 204, and can expose the API (e.g., a Kubernetes API) of the service provider platform 200. In embodiments, the service provider platform 200 may be an example of the service provider 106 as described in relation to FIG. 1 above. The API server 208 can scale horizontally (e.g., scale by deploying more instances) as it can be stateless and store data in the persistence store 214.

The controller manager 210 (e.g., a kube-controller-manager, cloud-controller-manager) might be a collection of various managers rolled up into one binary. The controller manager 210 can include a node controller, replication controller, endpoints controller, service controller, volume controller, and others. The node controller can be responsible for noticing and responding when nodes go down. The replication controller can be responsible for maintaining the correct number of pods for every replication controller in the system. The endpoints controller can populate endpoints (e.g., pods). The service controller can be responsible for creating, updating, and deleting network services (e.g., firewalling, load balancing, deep packet inspection, etc.). The volume controller can be responsible for creating, attaching, and mounting volumes.

The scheduler 212 (e.g., a kube-scheduler) can be responsible for scheduling pods into nodes. This can involve evaluation of resource requirements, service requirements, hardware/software policy constraints, node affinity and anti-affinity specifications, pod affinity and anti-affinity specifications, data locality, and deadlines, among other factors.

The persistence store (e.g., etcd) 210 might be a high-availability distributed data store. The service provider platform 200 can use the persistence store 214 to store cluster state information. In a small, short-lived cluster, a single instance of the persistence store 214 can run on the same host as other control plane components, but for larger clusters, the persistence store 214 may comprise a cluster of hosts (e.g., 3-5 nodes) for redundancy and high availability.

The cloud manager 216 enables the cluster 202 to be linked into an API of a cloud provider 218 and separates out the components that interact with that cloud platform from components that only interact with the cluster 202. In embodiments, the cloud manager 216 may run a controller that is specific to a particular cloud provider.

As depicted, the cluster 202 may further include a number of nodes 206. A node 206 can include a number of components, such as an agent 220 (e.g., kubelet), a proxy 222 (e.g., kube proxy, Open vSwitch (OVS)/Contiv netplugin, etc.), and a number of pods 224. Each node 206 may maintain the number of pods 224 and provide a container runtime environment for the service provider platform 200. The container runtime can be responsible for running containers 226 (e.g., Docker®, rkt from CoreOS®, Inc., runC from the Open Container Initiative™, etc.). Each of the nodes 206 can correspond to a single host, which can be a physical or virtual machine.

The agent 220 (1-2) may run on each node 206 in a cluster and ensure that containers (e.g., container 226 (1)(A)(1-M), container 226 (1)(B)(1-N), container 226 (2)(A)(1-P), and container 226 (2)(B)(1-Q)) (collectively, "226")) are running in a pod (e.g., pods 224 (1)(A), 224 (1)(B), 224 (2)(A), and 224 (2)(B) (collectively, "224")). The agent 220 can oversee communications with the control plane 204, including downloading secrets from the API server 208, mounting volumes, or reporting the status of the node 206 and each pod 224.

Pods 224 can manage groups of closely-related containers 226 that may depend on each other and that may need to cooperate on the same host to accomplish their tasks. Pods can be scheduled together in order to run on the same machine. The containers 226 in each pod 224 can have the same IP address and port space and can communicate using localhost or standard inter-process communication. In addition, the containers 226 in each pod 224 can have access to shared local storage on the node 206 that is hosting the pod. The shared storage can be mounted on each container 226.

The proxy 222 is responsible for container networking, including low-level network housekeeping on each node, reflection of local services, TCP and UDP forwarding, and/or finding cluster IPs through environmental variables or Domain Name System (DNS). In some embodiments, the service provider platform 200 may employ a networking model that relates how the nodes 206, pods 224, and containers 226 interact with one another, such as ensuring that containers can communicate with each other and the IP address that a container sees itself as is the same IP address that others see it as. This networking model can assign IP addresses at the pod level such that containers within a pod share an IP address and port space. This networking model can also enable containers within a pod to reach other containers' ports on localhost.

The service extension engine 112 may be configured to determine an exposure of each of a number of services (as provided in relation to a respective number of pods) to a detected threat or vulnerability. Upon determining that the use of a service has a high potential to expose a user to the detected threat, the service extension engine 112 may be configured to identify a service (e.g., a security service) that is capable of mitigating the risk of exposure to the detected threat. The service extension engine 112 may then be configured to alter a data flow within a pod associated with the service to include the identified service. In some cases, this may involve inserting (e.g., instantiating) at least one additional pod 224 into the node 206 such that a data flow between the pods is rerouted to flow through the inserted pod. In another example, the identified service may be inserted into a container (e.g., a container that houses a component determined to be vulnerable to the threat) via a sidecar. Each of these examples are described in greater detail elsewhere.

The service provider platform 200 can enable intra-node communication or pod-to-pod communication within the same node via local filesystem, any IPC mechanism, or localhost. The service provider platform 200 can support various approaches for inter-node communication or pod-to-pod communication across nodes, including L2 (switching), L3 (routing), and overlay networking. The L2 approach can involve attaching an L2 network to a node's physical network interface controller (NIC) and exposing the pod directly to the underlying physical network without port mapping. Bridge mode can be used to enable pods to interconnect internally so that traffic does not leave a host unless necessary. The L3 approach may not use overlays in the data plane, and pod-to-pod communication can happen over IP addresses leveraging routing decisions made by node hosts and external network routers. Pod-to-pod communication can utilize Border Gateway Protocol (BGP) peering to not leave the host, and NAT for outgoing traffic. An overlay approach can use a virtual network that may be decoupled from the underlying physical network using tunneling technology (e.g., Virtual Extensible LAN (VXLAN), Generic Routing Encapsulation (GRE), Segment Routing (SR), etc.). Pods in the virtual network can find each other via tunneling. In addition, L2 networks can be isolated from one another, and L3 routing can be utilized for inter-node pod-to-pod communication.

In some embodiments, the service provider platform 200 can support labels and selectors. Labels are key-value pairs that can be used to group together sets of objects, such as pods. Labels can also be used to specify attributes of objects that may be meaningful and relevant to network users. There can be an N×N relationship between objects and labels. Each object can have multiple labels, and each label may be applied to different objects. Each label on an object may have a unique key. The label key can include a prefix and a name. The prefix can be optional. If the prefix exists, it can be separated from the name by a forward slash (/) and be a valid DNS subdomain. The prefix and the name can have specified maximum lengths (e.g., 253 and 63 characters, respectively). Names can start and end with an alphanumeric character (a-z, A-Z, 0-9) and include alphanumeric characters, dots, dashes, and underscores in between. Values can follow the same restrictions as names.

Label selectors can be used to select objects based on their labels and may include equality-based selectors and set-based selectors. Equality (and inequality) based selectors can allow for selection of objects by key name or value. Matching objects must satisfy specified equality (= or ==) or inequality (!=) operators. Set-based selectors can enable selection of objects according to a set of values, including objects that are "in" or "not in" the set or objects having a key that "exists." An empty label selector can select every object in a collection. A null label selector (which may only be possible for optional selector fields) may select no objects.

In some embodiments, the service provider platform 200 may support a number of container services. A container service is an abstraction that defines a logical set of pods and a policy by which to access them. The set of pods targeted by a container service can be determined by a label selector. Services can be published or discovered through DNS or environment variables. Services can be of different types, such as a ClusterIP, NodePort, LoadBalancer, or ExternalName. A ClusterIP can expose a container service on a cluster-internal IP such that the container service may only be reachable from within the cluster. A NodePort can expose a container service on each node's IP at a static port. A ClusterIP container service, to which the NodePort container service may route, can be automatically created. The NodePort container service can be contacted from outside the cluster by requesting <NodeIP>:<NodePort>. A LoadBalancer can expose a container service externally using a cloud provider's load balancer. NodePort and ClusterIP container services, to which the external load balancer routes, may be automatically created. An ExternalName can map a container service to the contents of a specified Canonical Name (CNAME) record in the DNS.

For clarity, a certain number of components are shown in FIG. 2. It is understood, however, that embodiments of the disclosure may include more than one of each component. In addition, some embodiments of the disclosure may include fewer than or greater than all of the components shown in FIG. 2. In addition, the components in FIG. 2 may communicate via any suitable communication medium (including the Internet), using any suitable communication protocol.

Figure 3:
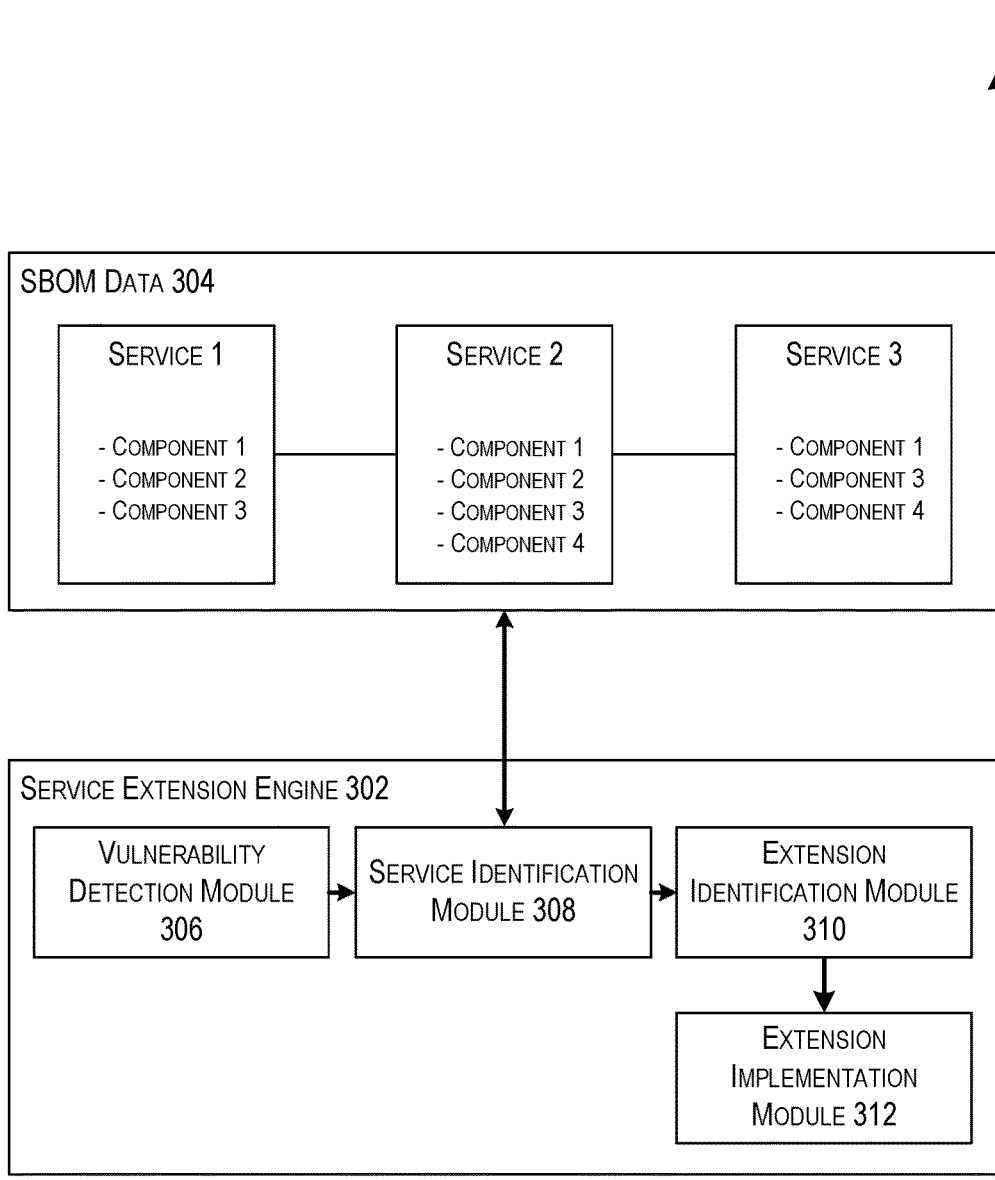
FIG. 3 depicts an example of a service extension engine that may be implemented to perform dynamic service extension to mitigate a detected software vulnerability in accordance with at least some embodiments.

FIG. 3 depicts an example of a service extension engine that may be implemented to perform dynamic service extension to mitigate a detected software vulnerability in accordance with at least some embodiments. As noted elsewhere, a service extension engine 302 may be implemented within a service provider platform. It should be noted that the service extension engine 302 may be an example of the service extension engine 112 as depicted in FIG. 1.

As noted elsewhere, the system may include SBOM data 304 that includes a record of what software components are associated with a service (e.g., a software service). In some embodiments, the SBOM data 304 may be included in a memory of the service provider platform. In other embodiments, the SBOM data 304 may be located in memory of a remote server that can be accessed by the service provider platform.

In some cases, the SBOM data 304 may include an indication of various components that are associated with each of a number of services (e.g., services 1-3). In embodiments, the SBOM data 204 may be implemented on an immutable record. For example, the SBOM data 204 may be implemented as a blockchain ledger (e.g., Supply Chain Integrity, Transparency, and Trust (SCITT)) or an append-only database. It should be noted that the use of an immutable record in the system may prevent providers of a service from hiding or otherwise misrepresenting a dependence of the service on particular components that may be revealed to be vulnerable to a threat. In some embodiments, the SBOM data may be arranged in a tree structure, indicating multiple layers of relationships between the various components. In some cases, the SBOM data may include an indication of a reference to a component that might represent another service (e.g., software application) for which additional SBOM data may be maintained.

In some cases, the SBOM data 204 may differentiate the record of components (e.g., artifacts) in a service or software application by version (e.g., software release version). By way of illustration, while each version of a service or software application may utilize a common set of components (e.g., libraries, open-source packages, repositories, etc.), the particular combination of components associated with the service or software application may be different for each version.

In embodiments, the service extension engine 302 may include a number of modules configured to perform the functionality as described herein. For example, the service extension engine 302 may include a vulnerability detection module 306, a service identification module 308, an extension identification module 310, and an extension implementation module 312.

A vulnerability detection module 306, as described herein, may be configured to identify and detect new threats (i.e., vulnerabilities) that may impact one or more services. In some embodiments, this may involve receiving an indication of a threat from a third-party vulnerability management application, such as Kenna or CyberVision. In embodiments, the indication of the threat may include information about what software components are impacted by the threat as well as what potential impact the threat might have on the component. Accordingly, the vulnerability detection module 206 may be configured to identify, for each detected risk, components that may be at risk in relation to that component.

Once a threat has been identified, a service identification module 308 may be configured to identify each of the services that rely upon, or are otherwise associated with, the one or more of the components determined to be at risk of vulnerability from the detected threat. In various embodiments, the service identification module 308 is configured to locate references to a vulnerable component within the SBOM data 204 (e.g., within blocks of a blockchain ledger). Each time that such a reference is identified, a corresponding service (or software application) associated with that reference is determined. This process is repeated until each of the services associated with a component determined to be at risk of vulnerability has been determined.

Once a number of such services have been determined, the extension identification module 310 may be configured to identify an additional service (e.g., an extension) that can be used to mitigate the exposure of an identified service to the detected threat. For example, if the detected threat is a software virus, then the extension identification module 310 may identify a virus scanner software application capable of mitigating (e.g., neutralizing) the threat.

Once at least one additional service has been identified by the extension identification module 310, an extension implementation module 312 may be configured to instantiate the identified service. In some embodiments, the extension implementation module 312 may be configured to instantiate a new pod that includes the identified service which is then inserted into the data flow between the current pods. In some embodiments, the extension implementation module 312 may be configured to generate a container that includes the identified service and the additional service (e.g., via a sidecar container). Once the generated container has been instantiated, any containers that include the identified service but not the additional service may be shut down.

Figure 4:
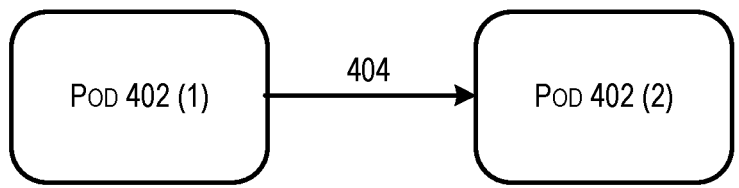
FIG. 4 depicts an illustrative example of a first technique for implementing threat mitigation in accordance with at least some embodiments.
Figure 4:
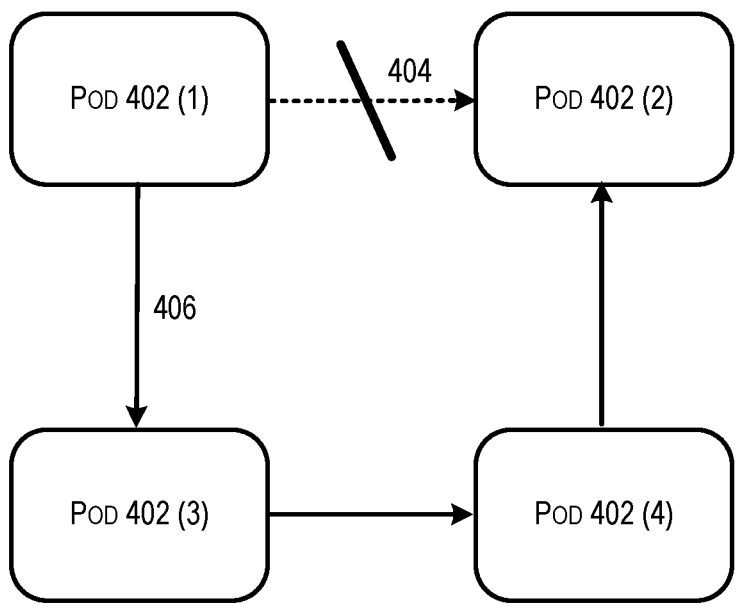

FIG. 4 depicts an illustrative example of a first technique for implementing threat mitigation in accordance with at least some embodiments. In the techniques depicted in FIG. 4, a service determined to be capable of mitigating a threat is implemented within a data flow via a pod that instantiate the service. In some embodiments, multiple services determined to be capable of mitigating a threat are implemented within the data flow via multiple pods that instantiate the respective services.

As depicted in FIG. 4, an initial data flow (e.g., within a node) may include a first pod 402 (1) that performs a first service on received data and routes the resulting data to a second pod 402 (2) that performs a second service on the data.

In the above example, a determination may be made that at least one of the pod 402 (1) or 402 (2) is potentially vulnerable to a current threat upon determining that at least one component associated with the respective pod is vulnerable to a detected threat. In this scenario, one or more additional services may be identified that are capable of mitigating the risk of the detected threat. Continuing with the scenario, the one or more additional service may be implemented within a new pod that is dedicated to the respective service. Data flow originating from pod 402 (1) is then rerouted such that it is sent to the new pod 402 (3) over route 406 instead of to pod 402 (2) over route 404. In some cases, the one or more additional service may include multiple services, such that at least one second new pod 402 (4) is also inserted into the data flow as depicted.

In some embodiments, the new pod 402 (3) or 402 (4) may be implemented within a data flow upon determining that at least one existing pod (e.g., 402 (1) and/or 402 (2)) is vulnerable to a current threat (e.g., based on its association with a vulnerable component) in order to mitigate the risk associated with that vulnerability. Once inserted into the data flow, the new pod(s) 402 (3) and/or 402 (4) are configured to perform the respective service on the data traversing the data flow. For example, one such service might be a virus scanner capable of detecting software viruses included in the data that traverses the data flow. In such embodiments, a new pod 402 (3) or 402 (4) may be implemented in the data flow either before or after the existing pod determined to be vulnerable to the threat.

Figure 5:
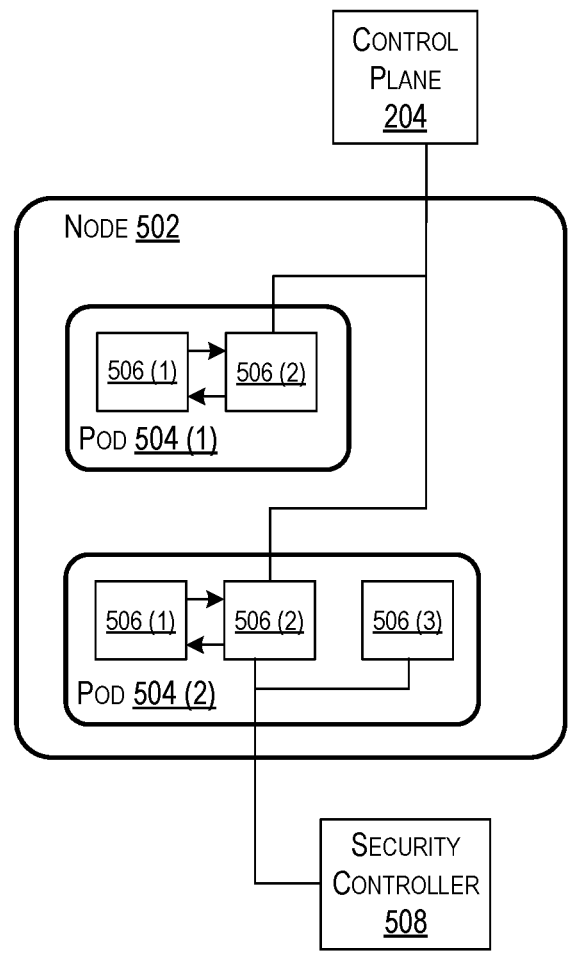
FIG. 5 depicts an illustrative example of a second technique for implementing threat mitigation in accordance with at least some embodiments.

FIG. 5 depicts an illustrative example of a second technique for implementing threat mitigation in accordance with at least some embodiments. In the techniques depicted in FIG. 5, a service determined to be capable of mitigating a threat is implemented via a container referred to as a sidecar.

A sidecar is a container that can operate alongside a service container (e.g., a container implementing a service) to provide the service container with additional capabilities. A proxy for the sidecar can mediate and control network communication between services and microservices. In some embodiments, sidecar proxies may be implemented as Envoy™ Proxies. Such sidecar proxies can support load balancing for Hypertext Transfer Protocol Version 1.1 (HTTP/1.1), HTTP/2, QUIC, and general-purpose Remote Procedure Calls (gRPC). In addition, the sidecar proxies can provide request-level metrics, tracing spans, active and passive health checking, and service discovery, among other tasks.

As discussed elsewhere, a node 502 may be implemented within a cluster that includes a number of pods 504 (e.g., pods 504 (1) and 504 (2)) that each implement a service. In general, a pod 504 includes a number of containers 506 (e.g., 506 (1-3)), that may include at least one service container as well as any number of sidecar containers that are configured to operate in concert with the application container. For example, a pod 504 (1) may include an application container 506 (1) that is configured to perform a service on data provided to the pod 504 (1). In this example, the application container 506 (1) may be configured to exchange data with a sidecar container 506 (2) in order to perform the service.

In the above example, a determination may be made that the pod 504 (1) is potentially vulnerable to a current threat upon determining that at least one component associated with pod 504 (1) is vulnerable to the detected threat. In this scenario, one or more additional services may be identified as being capable of potentially mitigating the detected threat. Upon identifying the one or more additional services, that identified service may be implemented within a sidecar container 506 (3) that is added to the pod as depicted as 504 (2). In some embodiments, the sidecar container enables a security controller 508 to interact with data flowing between the containers within the pod 504 (2).

In some embodiments, upon making a determination that a pod 504 (1) is to be updated to include a sidecar container 506 (3), a new pod 504 (2) is generated having the sidecar container 506 (3) included within it. Once the new pod 504 (2) is instantiated within the node 502, the old pod 504 (1) (without the sidecar container 506 (3)) may be shut down.

Figure 6:
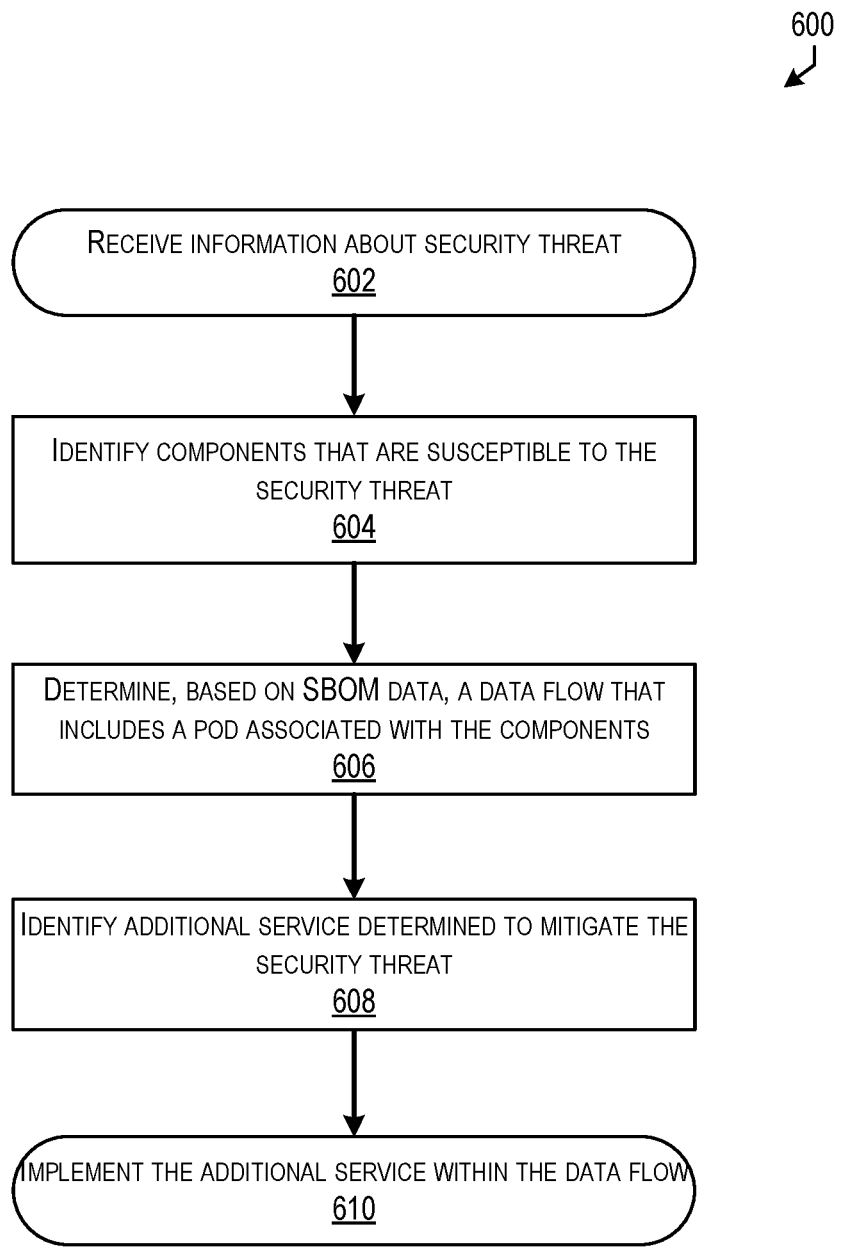
FIG. 6 depicts a block diagram illustrating an example of a process for dynamic service extension for risk mitigation upon detecting a threat in accordance with at least some embodiments.

FIG. 6 depicts a block diagram illustrating an example of a process for dynamic service extension for risk mitigation upon detecting a threat in accordance with at least some embodiments. The process 600 may be performed by a service extension engine implemented on a service provider platform, such as the service extension engine 112 as described in relation to FIG. 1 above.

At 602, the process 600 involves receiving information about a security threat. In some embodiments, the information about the security threat is received from a third-party vulnerability management application. An exemplary security threat may include at least one of a software virus or software exploit.

At 604, the process 600 involves identifying one or more components that may be susceptible to the security threat. The one or more components susceptible to the security threat may be identified based on information received from a third-party vulnerability management application. For example, when a third-party vulnerability management application (e.g., Kenna or CyberVision) provides information about a newly-detected security threat, that third-party vulnerability management application may also provide information about which software components may be susceptible to the detected security threat. In other embodiments, the one or more components susceptible to the security threat may be determined based on a function performed by the respective software component in relation to the security threat. For example, if a security threat pertains to an exploit made resulting from the use of a particular communication protocol, then a software component may be determined to be susceptible to the security threat is it uses that communication protocol.

At 606, the process 600 involves determining, based on a software bill of materials, at least one data flow that includes a pod associated with the one or more components. In embodiments, this may involve accessing the software bill of materials on a computing device that is separate from the service provider platform. In some cases, the software bill of materials is accessed on a blockchain ledger stored in relation to one or more components (e.g., software applications and/or services).

At 608, the process 600 involves identifying at least one additional service determined to mitigate the security threat. Such an additional service may include any service capable of reducing or removing a risk of exposure to the security threat. In one example, an additional service might be a virus scanning application. In another example, the additional service might be a software application that encrypts (or otherwise obfuscates) data so that it cannot be used if received by an unauthorized third party.

At 610, the process 600 involves implementing the at least one additional service in relation to the at least one data flow. In some embodiments, the at least one additional service is implemented via at least one new pod inserted into the at least one data flow, and wherein a portion of the at least one data flow is redirected to the at least one new pod. In some of these embodiments, the at least one additional service comprises multiple additional services, and the at least one new pod comprises multiple separate pods, each of the multiple separate pods corresponding to a respective additional service of the multiple additional services.

In some embodiments, the at least one additional service is implemented via a sidecar container. In these embodiments, the sidecar container is included within a new pod, with the new pod being an enhanced version of the pod associated with the one or more components. In these embodiments, the pod associated with the one or more components might be shut down after the new pod is implemented.

Figure 7:
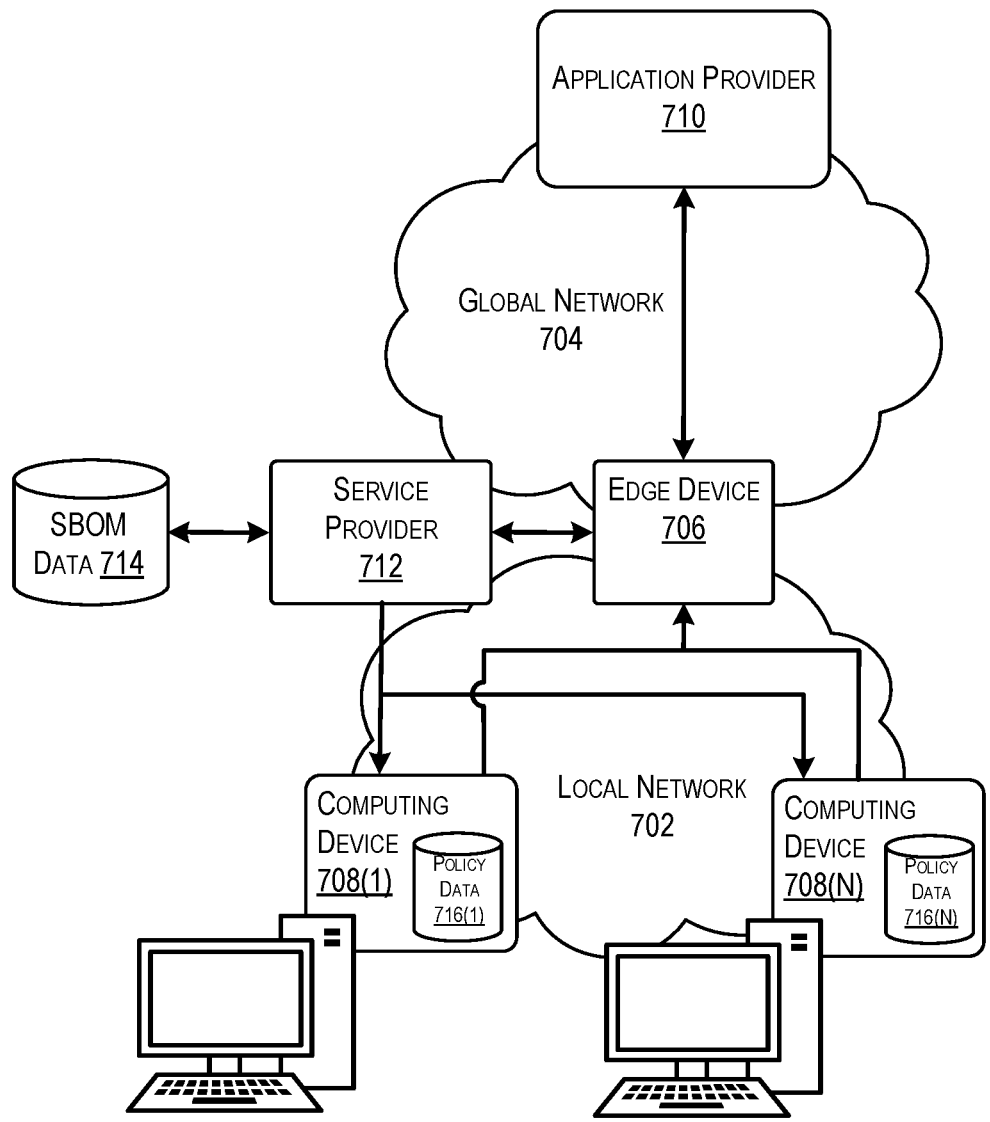
FIG. 7 depicts an example of an environment that includes a service provider platform that may be used to control access to applications hosted on an application provider in accordance with at least some embodiments.

FIG. 7 depicts an example of an environment that includes a service provider platform that may be used to control access to applications hosted on an application provider in accordance with at least some embodiments. As depicted, an organization may maintain a local network 702 that provides connectivity between a number of computing devices within the organization. The local network 702 may be in communication with a global network 704 (e.g., the Internet) via an edge device 706. In embodiments, such an edge device 706 is implemented on an electronic device that provides ingress/egress between the local network 702 and the global network 704, such as a router or other edge device.

A service provider platform 712 may be implemented in the example environment. In embodiments, the service provider platform 712 may include, or have access to, a software bill of materials (SBOM) data 714. The service provider platform 712 may be configured to generate policy data 716 to be distributed to the computing devices 708. In some cases, a separate policy data 716 (1-N) may be generated and distributed to a respective computing device 708 (1-N). In other cases, policy data relating to each of the computing devices 708 may be provided to an edge device 706.

In embodiments, a service provider 712 may be configured to determine, in relation to each computing device 708 (or user associated with the respective computing device), an acceptable level of risk that can be taken in communications originating at the respective computing device. In some embodiments, this may involve calculating a risk score to be associated with each of a number of software applications hosted by an application provider 710.

To calculate such a risk score, the service provider 712 may retrieve information about the various components associated with the software application to be accessed from SBOM data 714. In some cases, this may involve making an application programming interface (API) call to a computing device that is hosting the SBOM data 714. Additionally, the service provider 712 retrieves information about current vulnerabilities and/or threats. In embodiments, information about vulnerabilities and/or threats may be retrieved from a third-party vulnerability management service provider (e.g., Kenna or CyberVision). The service provider 712 may then calculate a risk score for the software application based on a vulnerability of each of the components associated with the software application in relation to the information retrieved about the current vulnerabilities and/or threats.

The service provider 712 may then determine, based on information provided by an organization, what level of risk (e.g., threshold risk score) is an acceptable level of risk to be associated with each of the computing devices 708 or users of those computing devices. For example, each of the different computing devices 708 (or users of those computing devices) may be associated with a different risk threshold. In some cases, such a risk threshold may be based on a role of the respective user. In embodiments, policy data 716 may be generated for each computing device that delineates which software applications can and/or cannot be accessed by the computing device 708 (or user) based on whether a risk score calculated for the software application is greater than a risk threshold for the computing device. The policy data 716 may include a blacklist or whitelist of software applications for the respective computing device. Such policy data 716 may then be distributed to another electronic device, such as the respective computing device 708 or an edge device 706.

As noted elsewhere, the local network 702 may be maintained in relation to an organization, such as a business or other group. The local network 702 may include a number of computing devices 708 (1-N) that are associated with that organization. In embodiments, a user of a computing device 708 may submit a request to access an application hosted by an application provider 710. For example, a user of the computing device 708 may request access to a Software as a Service (SaaS) application that is hosted on a remote server accessible over the global network 704.

Upon receiving the request to access an application, a determination may be made as to whether to allow the request to be forwarded to the application provider 710. In embodiments, this may involve determining whether a risk score associated with the request is in compliance with policy data 716 associated with the computing device 708 from which the request originated. In some cases, the determination is made by a software application installed upon, and executed from, the respective computing device 708. Alternatively, the determination is made by an edge device 706 that manages access to the application provider 710. In embodiments, the policy data 716 may be provisioned onto the edge device 706 by an administrator or other user associated with the organization that manages operations related to the local network 702.

Figure 8:
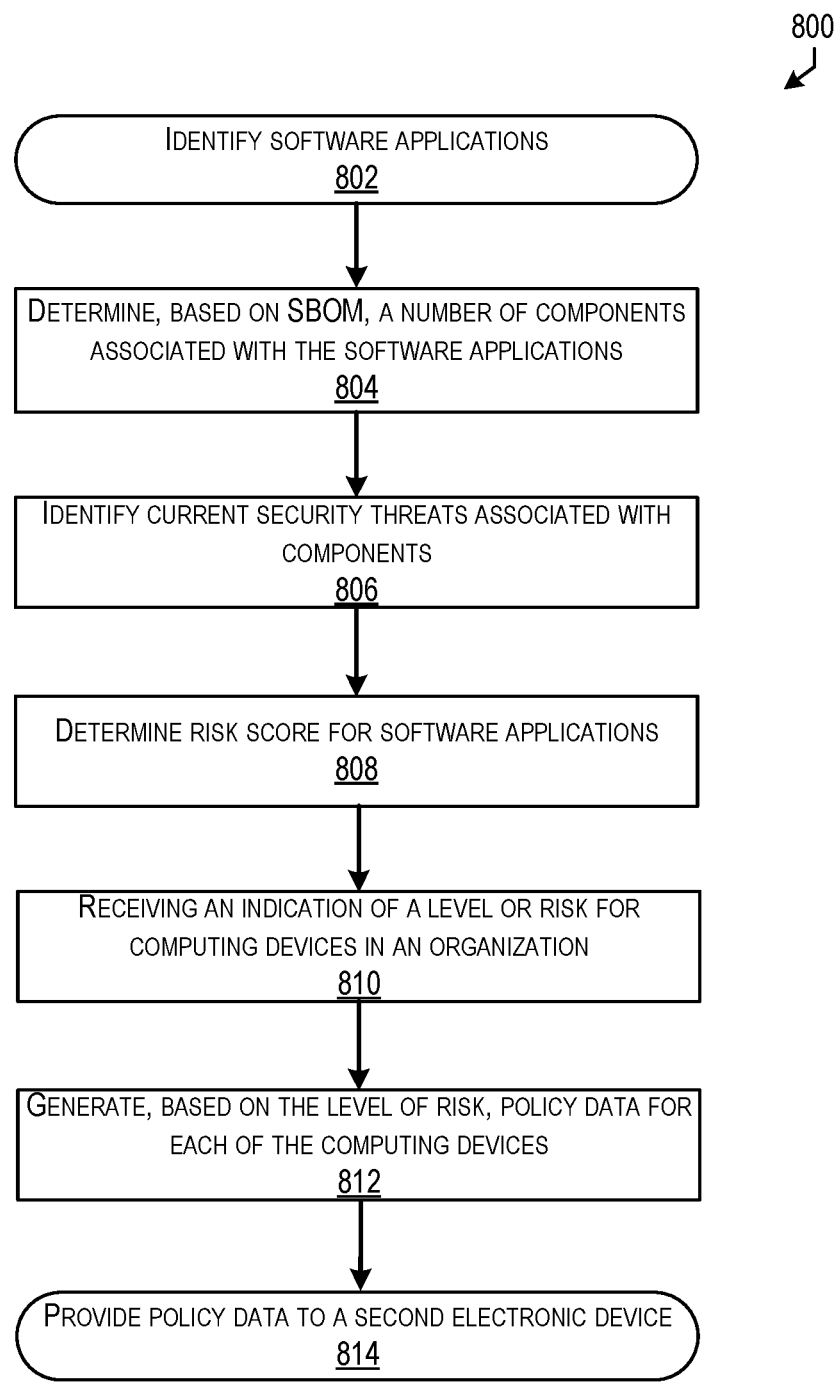
FIG. 8 depicts a block diagram illustrating an example of a process for allowing or denying network traffic for individual computing devices in an organization based on policy data for the organization in accordance with at least some embodiments.

FIG. 8 depicts a block diagram illustrating an example of a process for allowing or denying network traffic for individual computing devices in an organization based on policy data for the organization in accordance with at least some embodiments. The process 800 may be performed by a service provider computing device, such as the service provider 712 as described in relation to FIG. 7 above.

At 802, the process 800 involves identifying a number of software applications capable of being accessed by computing devices in an organization. In embodiments, the number of software applications may include software applications hosted on a remote server device. For example, the software applications may include cloud computing software applications hosted within a cloud computing platform.

At 804, the process 800 involves determining, based on a software bill of materials, a number of components associated with the number of software applications. As noted elsewhere, a SBOM may be implemented as an immutable record. In some embodiments, the SBOM may be implemented as a blockchain ledger. In various embodiments, such a blockchain ledger may be a decentralized ledger in that it is distributed across a number of geographically separated computing devices.

At 806, the process 800 involves identifying a number of current security threats associated with the number of components. Information about a number of current security threats may be received from a vulnerability management service as described elsewhere. In some embodiments, information about current security threats is stored in a database as that information is received. Such information may indicate details of the security threat, such as a severity, a type or category of security threat, and/or an indication of one or more components that are affected by the security threat.

At 808, the process 800 involves determining, based on the number of current security threats, a risk score associated with each of the number of software applications. This may further involve making a determination of which security threats are associated with the components of the software application. For example, a determination may be made as to which of the components associated with the software application are also associated with at least one current security threat. The risk score may be calculated based on an indicated vulnerability of each of the identified components of the target application to the security threat. In some embodiments, the risk score may further be calculated based on a severity and/or type of the threat.

At 810, the process 800 involves receiving, in relation to the organization, an indication of a level of risk for each of the computing devices (and/or users) in the organization. In some cases, the indication may include a level of risk that is an appropriate type or amount of risk that can be taken on. In some cases, such a policy may indicate a maximum risk score threshold, such that network traffic should only be allowed if it falls below that maximum risk score threshold. In some cases, the level of risk is represented as a numeric value. In some cases, the indication may include a level of risk to be associated with each of a number of user roles.

At 812, the process 800 involves generating, based on the risk score associated with the number of software applications and the level of risk for each of the computing devices, policy data for each of the computing devices. In some cases, a policy for a computing device may be generated to include a whitelist of software applications for which a respective risk score is lower than a respective level of risk for that computing device. In some cases, a policy for a computing device may be generated to include a blacklist of software applications for which a respective risk score is greater than a respective level of risk for that computing device.

At 814, the process 800 involves providing the policy data to at least one second computing device. In some cases, the policy data is provisioned onto the computing device to which the policy data pertains. In some cases, the policy data is provisioned onto an edge device, such as a router or other device that provides ingress/egress to another network.

Figure 9:
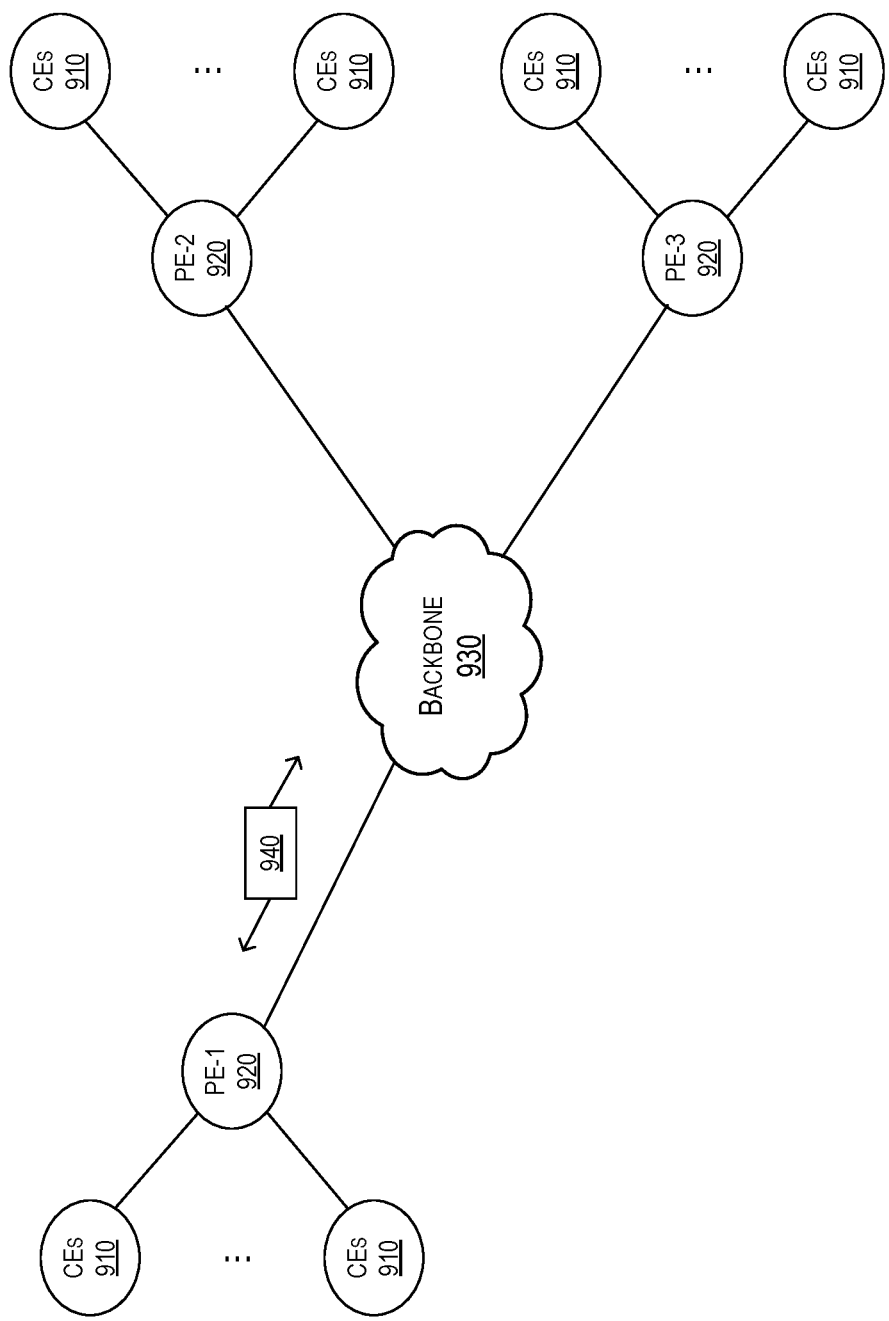
FIG. 9 is a schematic block diagram of an example computer network illustratively comprising nodes/devices, such as a plurality of routers/devices interconnected by links or networks, as shown.

FIG. 9 is a schematic block diagram of an example computer network 900 illustratively comprising nodes/devices, such as a plurality of routers/devices interconnected by links or networks, as shown. A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANS). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In the depicted example, customer edge (CE) routers 910 may be interconnected with provider edge (PE) routers 920 (e.g., PE-1, PE-2, and PE-3) in order to communicate across a core network, such as an illustrative network as backbone 930. For example, routers 910, 920 may be interconnected by the public Internet, a multiprotocol label switching (MPLS) virtual private network (VPN), or the like. Data packets 940 (e.g., traffic/messages) may be exchanged among the nodes/devices of the computer network 800 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 910 shown in network 900 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected is to network 900 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2, or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 910 connected to PE-2 and a second CE router 910 connected to PE-3.

Figure 10:
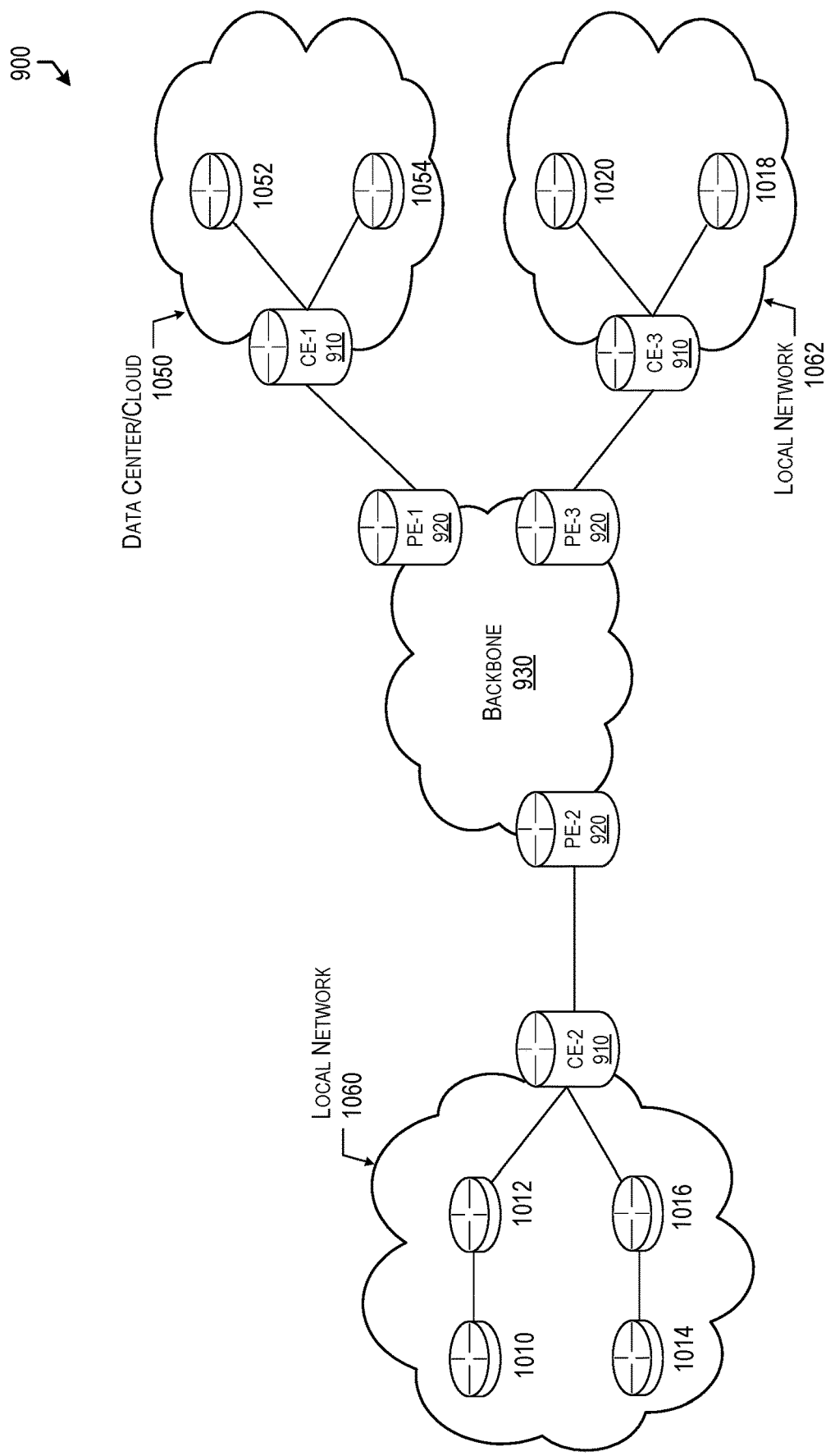
FIG. 10 illustrates an example of network in greater detail, according to various embodiments.

FIG. 10 illustrates an example of network 900 in greater detail, according to various embodiments. As shown, network backbone 930 may provide connectivity between devices located in different geographical areas and/or different types of local networks. For example, network 900 may comprise local/branch networks 1060, 962 that include devices/nodes 1010-1016 and devices/nodes 1018-1020, respectively, as well as a data center/cloud environment 1050 that includes servers 1052-1054. Notably, local networks 1060-962 and data center/cloud environment 1050 may be located in different geographic locations.

Servers 1052-1054 may include, in various embodiments, a network management server (NMS), a dynamic host configuration protocol (DHCP) server, a constrained application protocol (COAP) server, an outage management system (OMS), an application policy infrastructure controller (APIC), an application server, etc. As would be appreciated, network 900 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software defined WAN (SD-WAN) may be used in network 900 to connect local network 1060, local network 962, and data center/cloud 1050. In general, an SD-WAN uses a software defined networking (SDN)-based approach to instantiate tunnels on top of the physical network and control routing decisions, accordingly. For example, as noted above, one tunnel may connect router CE-2 at the edge of local network 1060 to router CE-1 at the edge of data center/cloud 1050 over an MPLS or Internet-based service provider network in backbone 930. Similarly, a second tunnel may also connect these routers over a 4G/5G/LTE cellular service provider network. SD-WAN techniques allow the WAN functions to be virtualized, essentially forming a virtual connection between local network 1060 and data center/cloud 1050 on top of the various underlying connections. Another feature of SD-WAN is centralized management by a supervisory service that can monitor and adjust the various connections, as needed.

Figure 11:
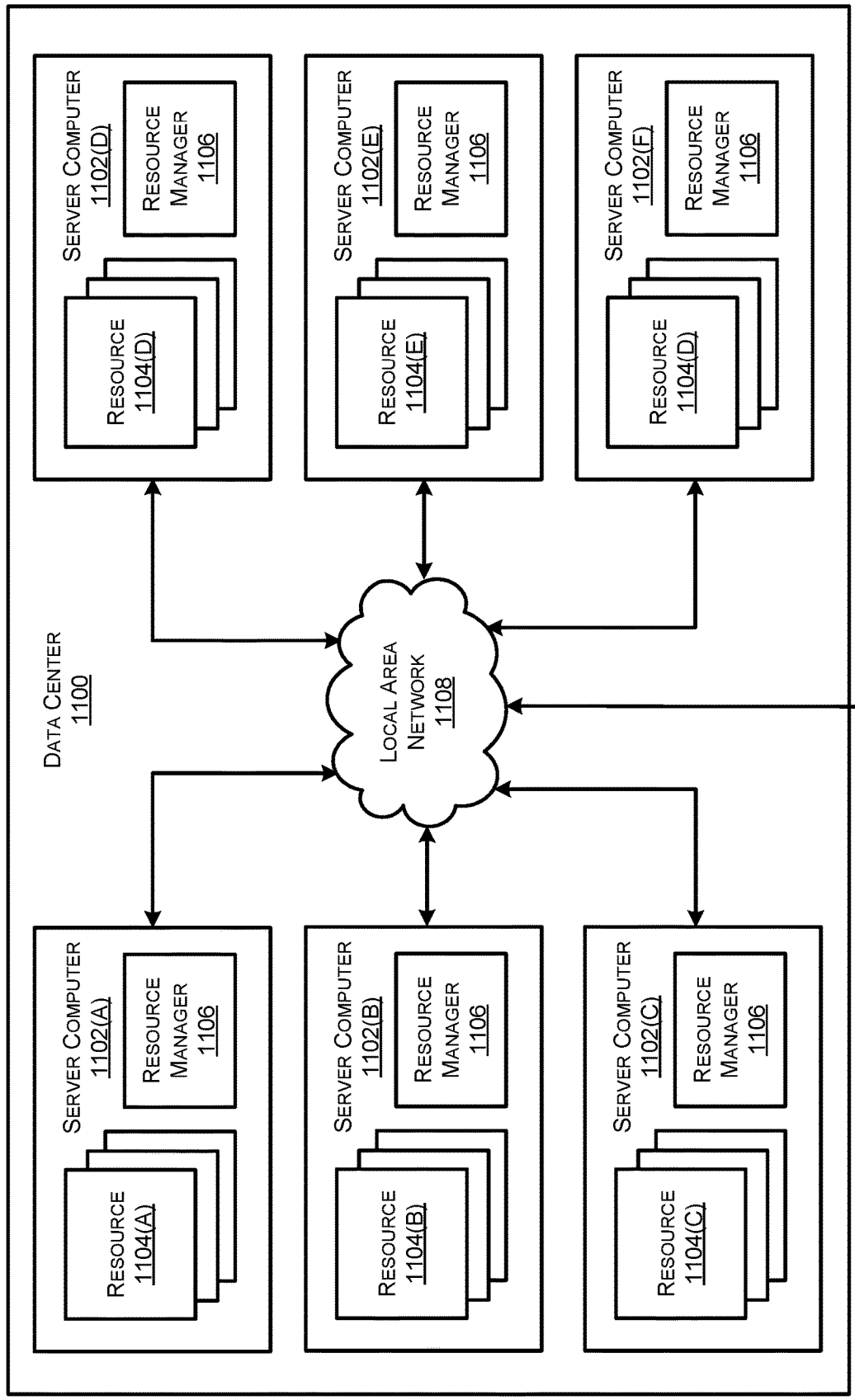
FIG. 11 is a computing system diagram illustrating a configuration for a data center that can be utilized to implement aspects of the technologies disclosed herein.

FIG. 11 is a computing system diagram illustrating a configuration for a data center 1100 that can be utilized to implement aspects of the technologies disclosed herein. The example data center 1100 shown in FIG. 11 includes several server computers 1102A-1102F (which might be referred to herein singularly as "a server computer 1102" or in the plural as "the server computers 1102") for providing computing resources. In some examples, the resources and/or server computers 1102 may include, or correspond to, the any type of networked device described herein. Although described as servers, the server computers 1102 may comprise any type of networked device, such as servers, switches, routers, hubs, bridges, gateways, modems, repeaters, access points, etc.

The server computers 1102 can be standard tower, rackmount, or blade server computers configured appropriately for providing computing resources. In some examples, the server computers 1102 may provide computing resources 1104 including data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1100 can also be configured to provide network services and other types of services.

In the example data center 1100 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1100, between each of the server computers 1102A-1102F in each data center 1100, and, potentially, between computing resources in each of the server computers 1102. It should be appreciated that the configuration of the data center 1100 described with reference to FIG. 11 is merely illustrative and that other implementations can be utilized.

In some examples, the server computers 1102 may each execute one or more application containers and/or virtual machines to perform techniques described herein.

In some instances, the data center 1100 may provide computing resources, like application containers, VM instances, and storage, on a permanent or an as-needed basis. Among other types of functionality, the computing resources provided by a cloud computing network may be utilized to implement the various services and techniques described above. The computing resources 1104 provided by the cloud computing network can include various types of computing resources, such as data processing resources like application containers and VM instances, data storage resources, networking resources, data communication resources, network services, and the like.

Each type of computing resource 1104 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 1104 not mentioned specifically herein.

The computing resources 1104 provided by a cloud computing network may be enabled in one embodiment by one or more data centers 1100 (which might be referred to herein singularly as "a data center 1100" or in the plural as "the data centers 1100"). The data centers 1100 are facilities utilized to house and operate computer systems and associated components. The data centers 1100 typically include redundant and backup power, communications, cooling, and security systems. The data centers 1100 can also be located in geographically disparate locations. One illustrative embodiment for a data center 1100 that can be utilized to implement the technologies disclosed herein will be described below with regard to FIG. 12.

Figure 12:
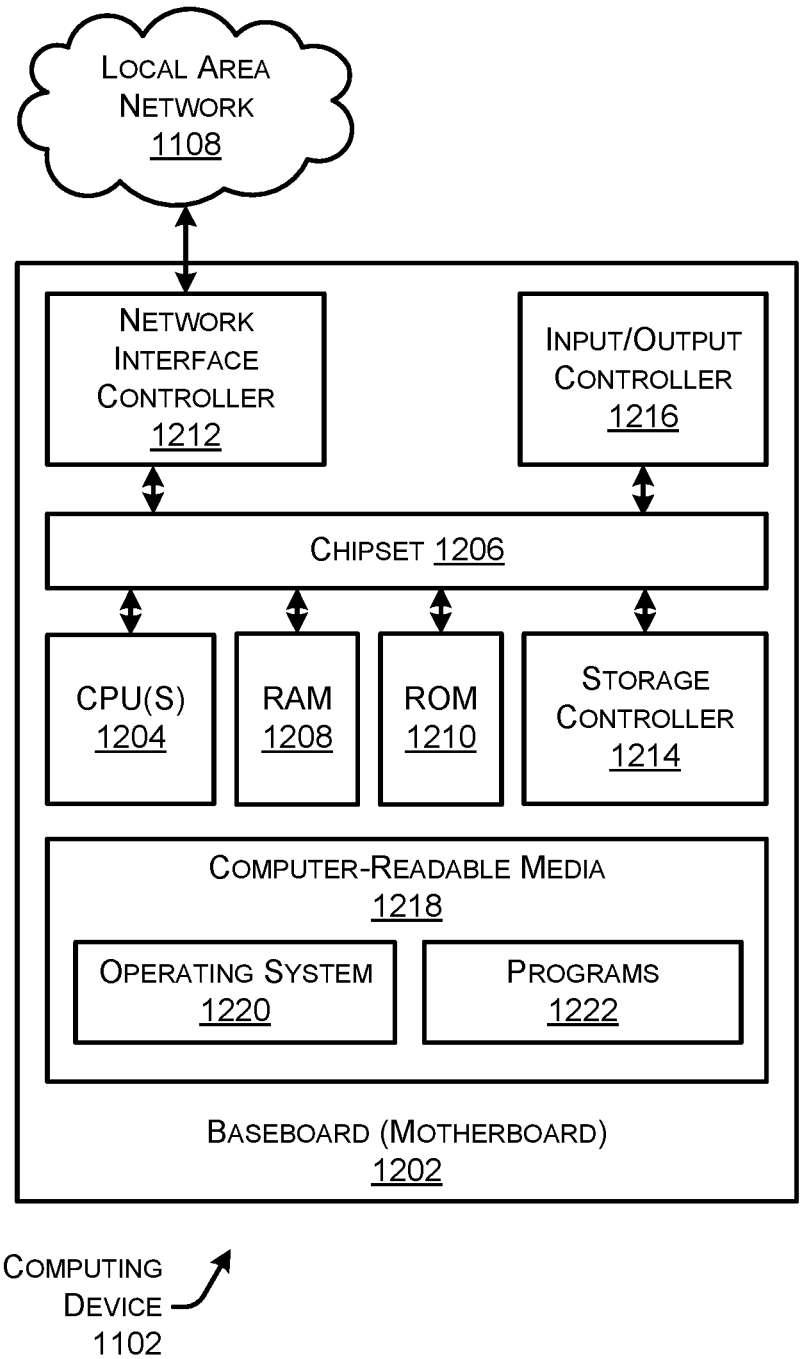
FIG. 12 shows an example computer architecture for a server computer capable of executing program components for implementing the functionality described above.

FIG. 12 shows an example computer architecture for a server computer 1102 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. The server computer 1102 may, in some examples, correspond to a physical server as described herein, and may comprise networked devices such as servers, switches, routers, hubs, bridges, gateways, modems, repeaters, access points, etc.

The computer 1102 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1102.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1202. The chipset 1206 can further provide an interface to a computer-readable storage medium such as a read-only memory ("ROM") 1210 or non-volatile RAM ("NVRAM") for storing basic routines that help to startup the computer 1102 and to transfer information between the various components and devices. The ROM 1210 or NVRAM can also store other software components necessary for the operation of the computer 1102 in accordance with the configurations described herein.

The computer 1102 can operate in a networked environment using logical connections to remote computing devices and computer systems through a network, such as the network 1108. The chipset 1206 can include functionality for providing network connectivity through a NIC 1212, such as a gigabit Ethernet adapter. The NIC 1212 is capable of connecting the computer 1102 to other computing devices over the network 1108. It should be appreciated that multiple NICs 812 can be present in the computer 1102, connecting the computer to other types of networks and remote computer systems.

The computer 1102 can be connected to a storage device 1218 that provides non-volatile storage for the computer. The storage device 1218 can store an operating system 1220, programs 1222, and data, which have been described in greater detail herein. The storage device 1218 can be connected to the computer 1102 through a storage controller 1214 connected to the chipset 1206. The storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1102 can store data on the storage device 1218 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1218 is characterized as primary or secondary storage, and the like.

For example, the computer 1102 can store information to the storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1102 can further read information from the storage device 1218 by detecting the physical states or characteristics of one or more particular locations within the physical storage units.

In addition to the mass storage device 1218 described above, the computer 1102 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1102. In some examples, the operations performed by devices as described herein may be supported by one or more devices similar to computer 1102. Stated otherwise, some or all of the operations performed by an edge device, and/or any components included therein, may be performed by one or more computer devices 1102 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1218 can store an operating system 1220 utilized to control the operation of the computer 1102. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1218 can store other system or application programs and data utilized by the computer 1102.

In one embodiment, the storage device 1218 or other computer-readable storage media is encoded with computer-executable instructions which, when loaded into the computer 1102, transform the computer from a general-purpose computing system into a special-purpose computer capable of implementing the embodiments described herein. These computer-executable instructions transform the computer 1102 by specifying how the CPUs 1204 transition between states, as described above. According to one embodiment, the computer 1102 has access to computer-readable storage media storing computer-executable instructions which, when executed by the computer 1102, perform the various processes described above with regard to the other figures. The computer 1102 can also include computer-readable storage media having instructions stored thereupon for performing any of the other computer-implemented operations described herein.

The computer 1102 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1102 might not include all of the components shown in FIG. 12, can include other components that are not explicitly shown in FIG. 9, or might utilize an architecture completely different than that shown in FIG. 12.

As described herein, the computer 1102 may include one or more hardware processors 1204 (processors) configured to execute one or more stored instructions. The processor(s) 1204 may comprise one or more cores. Further, the computer 1102 may include one or more network interfaces configured to provide communications between the computer 1102 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 800. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 1222 may comprise any type of programs or processes to perform the techniques described in this disclosure. The programs 1222 may comprise any type of program that cause the computing device 1102 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, PE Module may also include computer executable instructions that, when executed by processor(s), cause computing device 1102 to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANS (SD-WANs), traffic between individual sites is sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, at a service provider platform, information about a security threat;
identifying, by the service provider platform, one or more components susceptible to the security threat;
determining, by the service provider platform based on a software bill of materials, at least one data flow that includes a point of delivery (pod) associated with the one or more components;
identifying, by the service provider platform, at least one additional service determined to mitigate the security threat; and
implementing, by the service provider platform, the at least one additional service in relation to the at least one data flow.

2. The method of claim 1, wherein the information about the security threat is received from a third-party vulnerability management application.

3. The method of claim 1, wherein the security threat comprises at least one of a software virus or software exploit.

4. The method of claim 1, further comprising accessing the software bill of materials on a computing device that is separate from the service provider platform.

5. The method of claim 1, wherein the software bill of materials is accessed on at least one blockchain ledger stored in relation to one or more components.

6. The method of claim 1, wherein the at least one additional service is implemented via at least one new pod inserted into the at least one data flow, and wherein a portion of the at least one data flow is redirected to the at least one new pod.

7. The method of claim 6, wherein the at least one additional service comprises multiple additional services, and the at least one new pod comprises multiple separate pods, each of the multiple separate pods corresponding to a respective additional service of the multiple additional services.

8. The method of claim 1, wherein the at least one additional service is implemented via a sidecar container.

9. The method of claim 8, wherein the sidecar container is included within a new pod, the new pod being an enhanced version of the pod associated with the one or more components.

10. A service provider computing device comprising:
one or more processors; and
one or more non-transitory computer-readable media storing computer-executable instructions that, when executed by the one or more processors, cause the service provider computing device to perform operations comprising:
receiving information about a security threat;
identifying one or more components susceptible to the security threat;
determining, based on a software bill of materials, at least one data flow that includes a point of delivery (pod) associated with the one or more components;
identifying at least one additional service determined to mitigate the security threat; and
implementing the at least one additional service in relation to the at least one data flow.

11. The service provider computing device of claim 10, wherein the at least one additional service is implemented via at least one new pod inserted into the at least one data flow, and wherein a portion of the at least one data flow is redirected to the at least one new pod.

12. The service provider computing device of claim 11, wherein the at least one additional service comprises multiple additional services, and the at least one new pod comprises multiple separate pods, each of the multiple separate pods corresponding to a respective additional service of the multiple additional services.

13. The service provider computing device of claim 10, wherein the at least one additional service is implemented via a sidecar container.

14. The service provider computing device of claim 13, wherein the sidecar container is included within a new pod, the new pod being an enhanced version of the pod associated with the one or more components.

15. The service provider computing device of claim 14, wherein the pod associated with the one or more components is shut down after the new pod is implemented.

16. The service provider computing device of claim 10, wherein the at least one additional service comprises a virus scanning application.

17. One or more non-transitory computer-readable media storing computer-executable instructions that, when executed by one or more processors, cause the one or more processors to perform operations comprising:
   receiving information about a security threat;
   identifying one or more components susceptible to the security threat;
   determining, based on a software bill of materials, at least one data flow that includes a point of delivery (pod) associated with the one or more components;
   identifying at least one additional service determined to mitigate the security threat; and
   implementing the at least one additional service in relation to the at least one data flow.

18. The one or more non-transitory computer-readable media of claim 17, wherein the information about the security threat is received from a third-party vulnerability management application.

19. The one or more non-transitory computer-readable media of claim 17, wherein the security threat comprises at least one of a software virus or software exploit.

20. The one or more non-transitory computer-readable media of claim 17, wherein the software bill of materials is accessed on at least one blockchain ledger stored in relation to one or more components.

* * * * *